United States Patent [19]
Harkey

[11] 3,828,955
[45] Aug. 13, 1974

[54] TIRE CHANGING TOOL

[76] Inventor: Andrew D. Harkey, Rt. 2, Caddo, Okla. 74729

[22] Filed: Jan. 3, 1973

[21] Appl. No.: 320,728

[52] U.S. Cl............................... 214/332, 214/370
[51] Int. Cl............................................. B60b 29/00
[58] Field of Search .......... 214/330, 331, 332, 333, 214/334, 370, 85; 188/83, 189; 152/5, 6, 7, 246, 313

[56] References Cited
UNITED STATES PATENTS

| | | | |
|---|---|---|---|
| 911,412 | 2/1909 | Lang | 188/83 |
| 2,207,443 | 7/1940 | Schneider | 214/332 |
| 2,485,797 | 10/1949 | Will | 214/332 |
| 2,514,781 | 7/1950 | Miller | 214/332 |
| 2,703,657 | 3/1955 | Hudkins | 214/730 |
| 3,183,544 | 5/1965 | Bailey | 152/5 |
| 3,580,404 | 5/1971 | Moser | 214/85 |

Primary Examiner—Robert J. Spar
Assistant Examiner—Lawrence J. Oresky
Attorney, Agent, or Firm—Anthony A. O'Brien

[57] ABSTRACT

A tire changing tool including a lever plate having a flat surface terminating at an upturned lip for supporting a tire, a solid handle extending upwardly from the lever plate, and a pair of wheel assemblies mounting the lever plate and having soft rubber tires to resist rotation about their axles such that the tire changing tool will not freely roll.

1 Claim, 4 Drawing Figures

PATENTED AUG 13 1974 3,828,955

TIRE CHANGING TOOL

BACKGROUND OF THE INVENTION

1. Field of the Invention

The present invention pertains to tire changing tools and, more particularly, to a tire changing tool for lifting and positioning a tire during mounting and removal relative to a hub.

2. Discussion of the Prior Art

In order to change tires on vehicles, such as cars, trucks, buses and the like, the tire must be lifted off the hub once the nuts have been removed from the studs extending from the hub; and, similarly, the tire must be lifted for proper positioning during mounting of the tire on the hub. Such lifting of tires is normally accomplished manually; however, in many cases the tires are too heavy and unwieldy to permit changing by a single person.

In order to facilitate the lifting and positioning of tires relative to the hub of a vehicle, various tools and devices have been proposed, as exemplified by U.S. Pat. Nos. 1,892,979 to Clark, 2,135,802 to Dinkins, 2,207,443 to Schneider, 2,345,458 to Caron, 2,483,908 to Jackson and 3,123,238 to McKelvey. Prior art devices and tools for lifting and positioning tires, however, have suffered the disadvantages of being difficult to manipulate during tire changing operations, being relatively complex in structure and having insufficient strength to handle large loads without bending or otherwise deforming. One of the reasons for the difficulty in manipulation is that such tire changing devices and tools are invariably provided with wheels mounted in bearings to facilitate rolling and, therefore, require constant attention during tire changing operations.

SUMMARY OF THE INVENTION

Accordingly, it is a primary object of the present invention to provide a tire changing tool for lifting and positioning a tire overcoming the above-mentioned disadvantages of the prior art.

Another object of the present invention is to provide a tire changing tool with wheel assemblies constructed to have a slight drag to resist rolling.

A further object of the present invention is to construct a tire changing tool of three basic components including a lever plate, a handle and wheel assemblies integrally united to form a strong lever structure for handling large loads.

The present invention is generally characterized in a tire changing tool including a lever plate having a flat surface extending from a rear end to an upturned lip at a front end; a handle secured to the lever plate and extending upwardly from the rear end to a grip portion; and a pair of wheel assemblies mounting the lever plate on opposite sides, each wheel assembly including a soft rubber tire mounted on an axle to resist rolling of the tire changing tool.

Some of the advantages of the present invention over the prior art are that the tire changing tool is constructed simply of three basic components and is extremely strong and sturdy, the tire changing tool will not freely roll thereby facilitating manipulation during tire changing operations, and the grip of the handle extends upwardly sufficiently such that bending or kneeling is not required to operate the tire changing tool.

Other objects and advantages of the present invention will become apparent from the following description of the preferred embodiment taken in conjunction with the accompanying drawings.

DESCRIPTION OF THE PREFERRED EMBODIMENT

Figure 1:
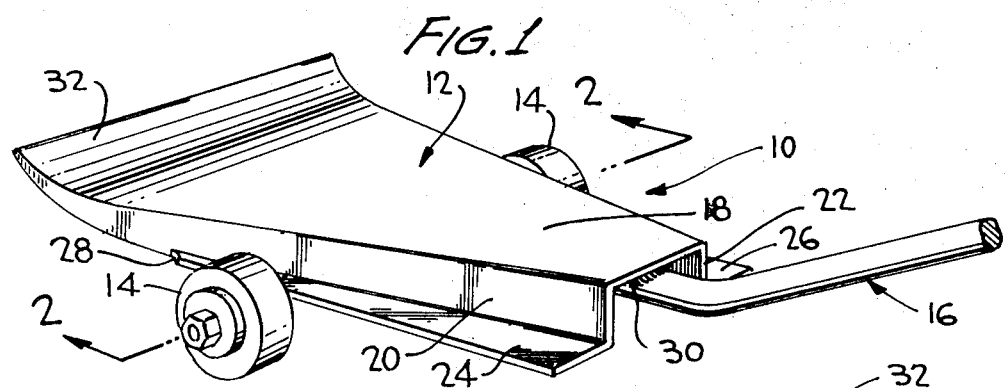
FIG. 1 is a broken perspective of a tire changing tool according to the present invention.
Figure 2:
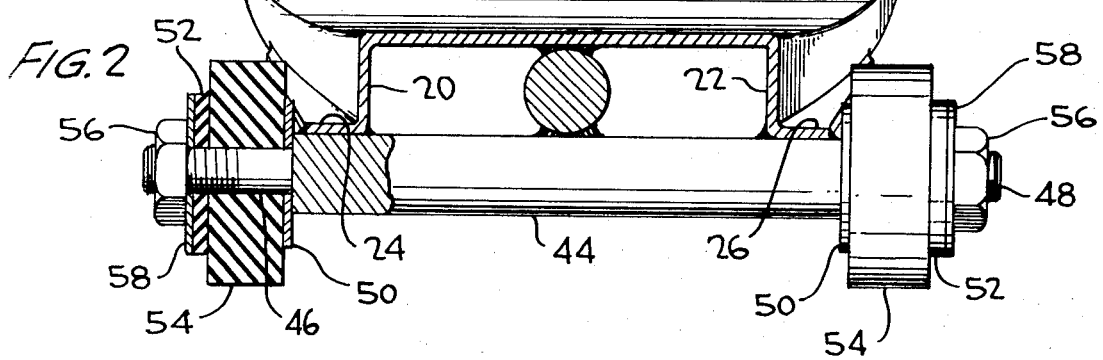
FIG. 2 is a section taken along line 2—2 of FIG. 1.

A tire changing tool 10 according to the present invention is illustrated in FIGS. 1 and 2 and includes a lever plate 12 mounted on a pair of wheel assemblies 14 and having a handle 16 extending therefrom. Plate 12 is constructed of relatively thick metal having a flat surface 18 and bent to form opposite side walls 20 and 22 terminating at flanges 24 and 26, respectively, which taper toward the front end of plate 12 and join the side walls at curved ends 28. Flat surface 18 tapers to a narrow rear end 30, and side walls 20 and 22 taper to a point at the front end of flat surface 18 which forms an upwardly curved lip 32.

Figure 3:
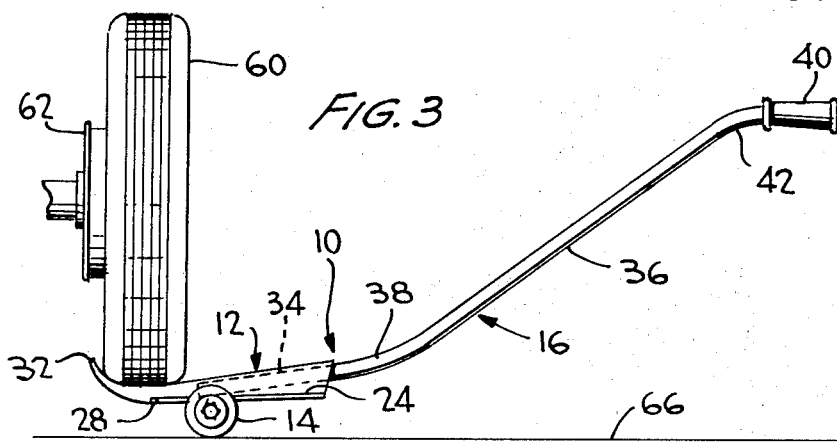
FIGS. 3 and 4 are side elevations of the tire changing of the present invention lifting and removing a tire from a hub, respectively.
Figure 4:
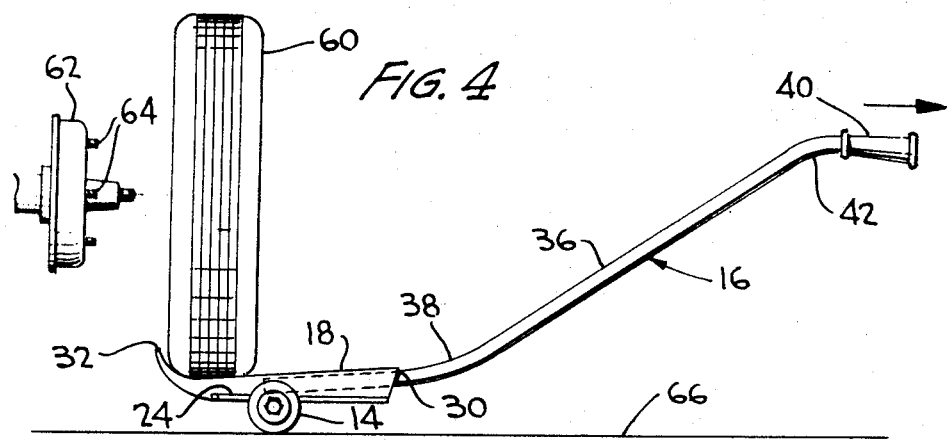

Handle 16 is constructed of a solid metal bar and includes a straight bottom portion 34 secured to plate 12 longitudinally at its center by welds, the bottom portion joining a straight central portion 36 through a curved bend 38 in the bar, as best shown in FIGS. 3 and 4. A grip portion 40 extends from the central portion 36 through a bend 42 in the bar such that the grip portion is disposed well above the wheel assemblies 14 to facilitate operation of tire changing tool 10.

A cross member 44 extends laterally along the bottom of plate 12 secured to flanges 24 and 26 and bottom portion 34 of handle 16 by welds, and extending from both ends of cross member 44 are axles 46 and 48 having externally threaded ends. Wheel assemblies 14 are mounted on axles 46 and 48, and each wheel assembly includes a metal washer 50 carried on the axle in engagement with cross member 44 and a rubber washer 52 carried on the axle and with washer 50 sandwiching a soft rubber tire 54 therebetween, the tire 54 having a central bore of a diameter such that it is in frictional engagement with the axle. A nut 56 threadedly receives the end of the axle to control the compression of tire 54 by forcing rubber washer 52 against the tire 54 via a metal washer 58.

The operation of tire changing tool 12 will be described with reference to FIGS. 3 and 4 for removal of a tire 60 from a hub 62 of a vehicle. As is conventional, the hub 62 has threaded studs 64 extending therefrom to receive nuts which clamp the rim of the tire to the hub. Once the vehicle is jacked up sufficiently to provide a clearance between the tire 60 and the ground surface 66 on which the wheel assemblies are rolled, the nuts are loosened and the lip 32 of the lever plate 12 inserted under the tire 60 such that the lip engages the inner sidewall of the tire as shown in FIG. 3. The operator can now with one hand apply downward pressure to grip portion 40 to pivot lever plate 12 about the wheel assemblies 14 to move the tire up and free the rim from the studs 64. The tire can now be simply removed from the hub 62 by rolling the tire changing tool 10 away from the hub 62 as shown in FIG. 4. If the tire 60 is resting on a ground surface of sand or gravel, a metal support plate is first placed under the tire of the vehicle, and the tire changing tool 10 is disposed to ride on the support plate.

The structure of lever plate 12 with side walls 20 and 22 and flanges 24 and 26 in a tapered, substantially inverted W-shape provides great strength to permit lifting of heavy loads, and the length of handle 16 coupled with the vertical displacement of the grip portion 40 above the wheel assemblies 14 provides sufficient leverage to lift tires for most vehicles without requiring the tire to be lifted manually and without the operator bending or kneeling. Furthermore, the tire changing tool can withstand sufficient force applied to handle 16 to permit ball joints of a vehicle to be tested by rolling the tire changing tool back and forth.

The wheel assemblies 14 of the tire changing tool 10 provide a slight drag to prevent the tire changing tool 10 from freely rolling back and forth during use. The drag is provided by the hard rubber washer 52 tightened against the outer sides of the soft rubber tires 54 and the contact of the soft rubber tires 54 with the axles. The position of the cross member 44 is such that the tire changing tool tends to rotate clockwise about the axles of the wheel assemblies, and this, coupled with the resistance to rolling of the wheel assemblies, permits the tire changing tool to be positioned as shown in FIG. 3 with the flat member 18 engaging the tire 60 and then lift while other tire changing operations are performed.

The tire changing tool 10 can be used for any operation requiring tire lifting and positioning; and, thus, while the operation was described above relative to the removal of a tire from a hub, the tire changing tool 10 can be simply used for mounting a tire on a hub by rolling the tire onto surface 18 and then rolling the tire changing tool to the hub. The tire can be properly vertically positioned for installation on the hub by controlling the force applied to grip portion 50 of the handle 16.

Inasmuch as the present invention is subject to many variations, modifications and changes in detail, it is intended that all matter described above and shown in the accompanying drawings be interpreted as illustrative and not in a limiting sense.

What is claimed is:

1. A tire changing tool comprising
a lever plate having sides and front and rear ends,
a handle, extending from the rear end of said lever plate, formed from a solid bar bent to form a straight bottom portion secured to said lever plate and an upwardly extending central portion joining a grip portion through a bend in said solid bar,
a cross member extending laterally along said lever plate secured to it and said handle in an off-center position such that said tire changing tool rotates about said cross member to move the front end of said lever plate upward, and
a pair of wheel assemblies mounted on opposite sides of said lever plate and including
axles extending from opposite ends of said cross member and having externally threaded ends,
rubber tires frictionally mounted on said axles to resist rolling of said tire changing tool,
rubber washers mounted on said axles and contacting said tires, and
nuts threaded on the end of each axle to force said washers against said tires,
said lever plate including
a flat surface extending from said rear end to an upturned lip at said front end of said flat surface being wider than said rear end,
a pair of side walls depending from opposite sides of said flat surface and tapering toward a point from said rear end to said front end, and
a pair of flanges at the termination of said side walls to strengthen said lever plate tapering toward a point from said rear end to said front end.

* * * * *